US011911994B2

(12) United States Patent
Cheich et al.

(10) Patent No.: US 11,911,994 B2
(45) Date of Patent: Feb. 27, 2024

(54) FAN-FOLDED SHEET STOCK MATERIAL SUPPORT FOR USE WITH A DUNNAGE CONVERSION MACHINE AND METHOD

(71) Applicant: Ranpak Corp., Concord Township, OH (US)

(72) Inventors: Robert C. Cheich, Independence, OH (US); Brian H. Stewartson, Hunterville, NC (US)

(73) Assignee: Ranpak Corp., Concord Township, OH (US)

( * ) Notice: Subject to any disclaimer, the term of this patent is extended or adjusted under 35 U.S.C. 154(b) by 33 days.

(21) Appl. No.: 17/742,861

(22) Filed: May 12, 2022

(65) Prior Publication Data

US 2022/0266564 A1 Aug. 25, 2022

Related U.S. Application Data

(62) Division of application No. 16/345,468, filed as application No. PCT/US2017/058566 on Oct. 26, 2017, now Pat. No. 11,358,361.

(Continued)

(51) Int. Cl.
*B31D 5/00* (2017.01)
*B65H 1/28* (2006.01)
*B65H 20/26* (2006.01)

(52) U.S. Cl.
CPC ............ *B31D 5/0039* (2013.01); *B65H 1/28* (2013.01); *B31D 2205/0035* (2013.01);

(Continued)

(58) Field of Classification Search
CPC .......... B31D 5/0039; B31D 2205/0005; B31D 2205/0011; B31D 2205/0017; B31D 2205/0035; B31D 2205/0047
See application file for complete search history.

(56) References Cited

U.S. PATENT DOCUMENTS 5,387,173 A 2/1995 Simmons, Jr.
5,836,538 A * 11/1998 Lencoski .............. B65H 16/06 242/399.1

(Continued)

OTHER PUBLICATIONS

International Search Report and Written Opinion dated Apr. 10, 2018, for priority International Patent Application No. PCT/US2017/058566.

*Primary Examiner* — Chelsea E Stinson
(74) *Attorney, Agent, or Firm* — Renner, Otto, Boisselle & Sklar, LLP

(57) ABSTRACT

A supply of single-ply, fan-folded sheet stock material includes a holder that facilitates simultaneously loading multiple plies of sheet stock material into a dunnage conversion machine for conversion into a dunnage product. The holder has inclined support surfaces and intersecting support walls that support the support surfaces in their inclined orientations. The holder has a W-shape cross-section, with inclined outer support surfaces and inclined inner support surfaces that may meet in the middle. The inner support surfaces generally are perpendicular to adjacent outer support surfaces to support a generally rectangular stack and sub-stacks of single-ply, fan-folded sheet stock material. The inclined support surfaces of the holder facilitate splitting the stack in half and supporting the two sub-stacks so that pages on top of the two stacks, connected by a center fold line, can be drawn into the conversion machine simultaneously.

10 Claims, 7 Drawing Sheets

Related U.S. Application Data

(60) Provisional application No. 62/413,728, filed on Oct. 27, 2016.

(52) U.S. Cl.
CPC ................ *B31D 2205/0047* (2013.01); *B31D 2205/0082* (2013.01); *B65H 20/26* (2013.01)

(56) References Cited

U.S. PATENT DOCUMENTS

| | | | | |
|---|---|---|---|---|
| 6,676,589 | B2 | 1/2004 | Küng et al. | |
| 7,022,060 | B2 | 4/2006 | Toth | |
| 2004/0142806 | A1* | 7/2004 | Coppus | B31D 5/0047 493/350 |
| 2012/0035038 | A1* | 2/2012 | Lembach | B65H 21/00 493/381 |

* cited by examiner

FAN-FOLDED SHEET STOCK MATERIAL SUPPORT FOR USE WITH A DUNNAGE CONVERSION MACHINE AND METHOD

This is a divisional of U.S. patent application Ser. No. 16/345,468, filed Apr. 26, 2019, which is a national phase of International Patent Application No. PCT/US2017/058566, filed Oct. 26, 2017, which claims the benefit of U.S. Patent Application No. 62/413,728, filed Oct. 27, 2016, each of which is hereby incorporated herein by reference in its entirety.

FIELD OF THE INVENTION

This invention relates generally to a support for a supply of fan-folded sheet stock material, particularly for use with a dunnage conversion machine for converting the sheet stock material into a dunnage product and a corresponding method.

BACKGROUND

In the process of shipping one or more articles in container, such as a cardboard box, from one location to another, a packer typically places some type of dunnage material in the shipping container along with the article or articles to be shipped. The dunnage material partially or completely fills the empty space or void volume around the articles in the container. By filling the void volume or cushioning or otherwise protecting the article, the dunnage prevents or minimizes damage to the articles during shipment.

To use storage space more efficiently, a dunnage conversion machine can be used to convert a supply of sheet stock material, such as a roll or stack of paper, into a lower density dunnage product. For example, U.S. Pat. No. 6,676,589 discloses an exemplary dunnage conversion machine that can convert a continuous sheet of paper into a crumpled strip of void-fill dunnage. This patent is hereby incorporated herein by reference. Such a converter can convert a compact supply of stock material into a much greater volume of dunnage.

SUMMARY OF THE INVENTION

The present invention provides a supply of single-ply, fan-folded sheet stock material and a support that facilitates simultaneously loading multiple plies of sheet stock material into a dunnage conversion machine for conversion into a dunnage product, and a corresponding method of loading a multi-ply sheet stock material into a dunnage conversion machine for conversion into a dunnage product.

In one embodiment, the supply of sheet stock material includes a holder for the stock material that facilitates splitting a stack of single-ply, fan-folded sheet stock material in half, forming two sub-stacks and exposing a center fold line connecting the two sub-stacks. When the center fold line is drawn into the conversion machine, sheet material will be drawn from each sub-stack, providing a multi-ply sheet stock material from the single-ply stack of fan-folded sheet stock material.

The present invention also provides a corresponding method for making a dunnage product from a two-ply stock material. The method generally includes the following steps: (a) laying open a stack of single-ply fan-folded sheet stock material to form two sub-stacks of sheet stock material; and (b) operating a dunnage conversion machine to simultaneously draw sheet stock material from both sub-stacks of sheet stock material, thereby providing a two-ply sheet stock material for conversion into a dunnage product. The stack of single-ply sheet stock material may include an upper portion and a lower portion, and the laying open step may include inverting the upper portion of the stack and displacing the upper portion from the lower portion, thereby forming the two sub-stacks of sheet stock material from the inverted upper portion of the stack and the lower portion of the stack.

The sub-stacks of sheet stock material are connected by an intermediate portion, and the operating step may include drawing the intermediate portion into the dunnage conversion machine. The intermediate portion may include a center fold line between each pair of sub-stacks.

The operating step may further include placing the intermediate portion of the sheet stock material adjacent a pair of rotating members in the dunnage conversion machine, in which case the operating step may include rotating the pair of rotating members to draw the intermediate portion of the sheet stock material between the pair of rotating members.

The laying open step also may include one or more of the following steps: (i) maintaining a continuous connection between the two stacks of sheet stock material during the laying open step, (ii) supplying a stack of single-ply sheet stock material that includes paper; (iii) supporting the two sub-stacks of sheet stock material in respective inclined orientations; and (iv) supporting the two sub-stacks of sheet stock material in inwardly-facing oppositely-inclined orientations.

The operating step may include one or more of: (i) randomly crumpling the sheet stock material; (ii) inwardly gathering the sheet stock material; and (iii) connecting overlapping layers of sheet stock material.

The present invention further provides a holder for a supply of sheet stock material that includes a plurality of inclined support surfaces and at least two intersecting support walls that support the support surfaces in their inclined orientations. The support surfaces may form a W-shape cross-section.

The support surfaces may include a first outer support surface and a first inner support surface generally perpendicular to the first outer support surface, and a second outer support surface and a second inner support surface generally perpendicular to the second outer support surface.

The first and second inner support surfaces may intersect. A cross-section across the first outer support surface, the first inner support surface, the second inner support surface and the second outer support surface may have a W-shape, with the outer support surfaces defining the outer legs of the W-shape cross-section and the inner support surfaces defining the inner legs of the W-shape cross-section.

The present invention also provides a system that comprises, in combination, a dunnage conversion machine that converts sheet stock material into a relatively lower-density dunnage product, and a holder as described above for a supply of sheet stock material adjacent the conversion machine to support sheet stock material for conversion into a dunnage product.

The present invention further provides, in combination, a supply of fan-folded sheet stock material having sides formed by adjacent fold lines, and a holder having a pair of support surfaces that are inclined in opposing directions. The support surfaces have sufficient length to support the entire stack on its side, with the stack separating into a pair of sub-stacks being supported by respective support surfaces.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

When using fan-folded sheet stock material to supply multi-ply sheet stock material to a dunnage conversion machine, typically separate stacks of single-ply, fan-folded sheet stock material are needed for each ply. Yet it is difficult to load sheet material from multiple separate stacks into a dunnage conversion machine at the same time. Sometimes a sheet from one stack feeds into the machine more readily that a sheet from another stack, and some sheet stock material is wasted before each of the sheets or plies are feeding through the conversion machine.

The present invention overcomes that problem by splitting a single stack of single-ply sheet stock material into two sub-stacks and feeding sheet stock material from between the pair of separate sub-stacks. In other words, to provide a two-ply sheet stock material, the initial stack is split in half, and beginning with a fold line between the sub-stacks, sheet stock material is drawn from a top of the bottom half of the stack (the bottom sub-stack) and from the top of the inverted top half of the stack (the top sub-stack) at the same time. In this way, a single-ply sheet stock material may be fed into a dunnage conversion machine from two stacks, specifically the sub-stacks, simultaneously, without waste as a two-ply sheet stock material.

Accordingly, the present invention provides a holder for a fan-folded sheet stock material and a corresponding method that make it easier to load a two-ply sheet stock material into a dunnage conversion machine for conversion into a relatively less dense dunnage product. Starting with a stack of single-ply, fan-folded sheet stock material, the stack is split into two sub-stacks, exposing connecting pages between the two sub-stacks with a center fold line in between. The center fold line can be fed into a dunnage conversion machine, which then draws the sheet material from each of the two sub-stacks, simplifying the loading of a two-ply sheet stock material, while making use of a stack of single-ply sheet material.

The present invention also provides a holder for the fan-folded stack that facilitates splitting the stack in half and then supports the two sub-stacks. The holder may have a W-shape cross-section, with inclined outer support surfaces and inclined inner support surfaces that may meet in the middle. The inner support surfaces generally are perpendicular to the outer support surfaces to support the generally rectangular stack and sub-stacks. Alternatively, the holder may have a pair of sloped surfaces meet in the middle to form an inverted approximately V-shape cross-section. A stack of sheet stock material may be placed on its side on the sloped surfaces and the peak of the V-shape cross-section will cause the stack to open up naturally in the middle, making it easier to draw a center fold line from the middle of the stack.

Figure 1:
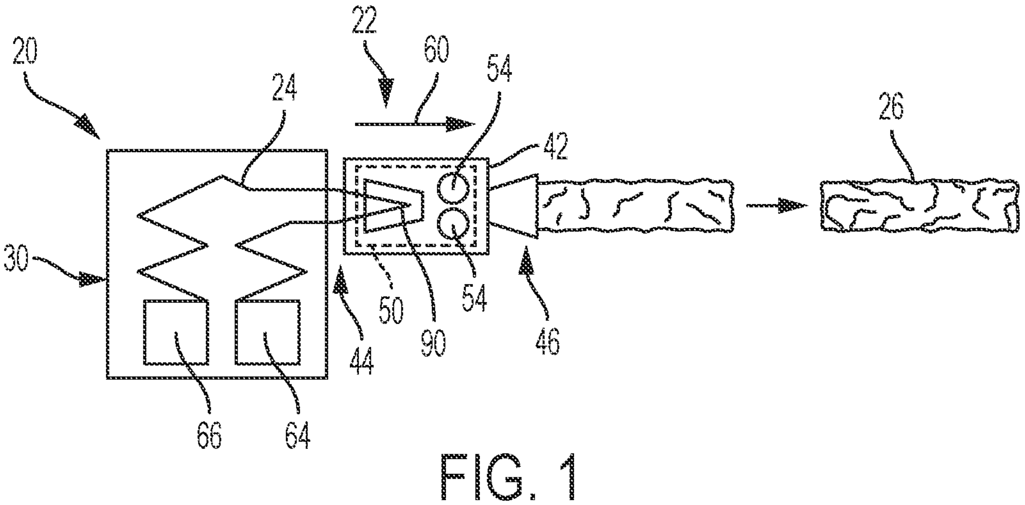
FIG. 1 is a schematic illustration of a dunnage conversion system provided in accordance with the invention.

Referring now to the drawings and initially FIG. 1, the illustrated system 20 includes a conversion machine 22, also referred to as a converter, for converting a sheet stock material 24 into a relatively less dense dunnage product 26, and a supply 30 of sheet stock material.

The converter 22 has a housing 42 with an inlet end 44 for receiving sheet stock material 24 and an outlet end 46 for dispensing dunnage 26. The converter 22 also includes a conversion assembly 50, generally contained within the housing 42, for converting the stock material 24 into the dunnage product 26. The conversion assembly 50 has a movable element 52, such as a pair of opposed rotatable members 54, for moving the stock material 24 through the conversion assembly 50 as the stock material 24 is converted to the dunnage product 26. The stock material 24 moves from an upstream end 56, by the inlet end 44, in a downstream direction 60 through the conversion assembly 50 to a downstream end at the outlet end 46.

The dunnage conversion system 20 is not limited to a particular type of converter, as long as the converter 22 converts a sheet stock material 24, such as paper, into a strip of relatively lower density dunnage from which discrete dunnage products 26 may be separated. Paper is reusable, recyclable, and composed of a renewable resource, making it an environmentally-responsible choice for a sheet stock material for conversion into dunnage.

Figure 2:
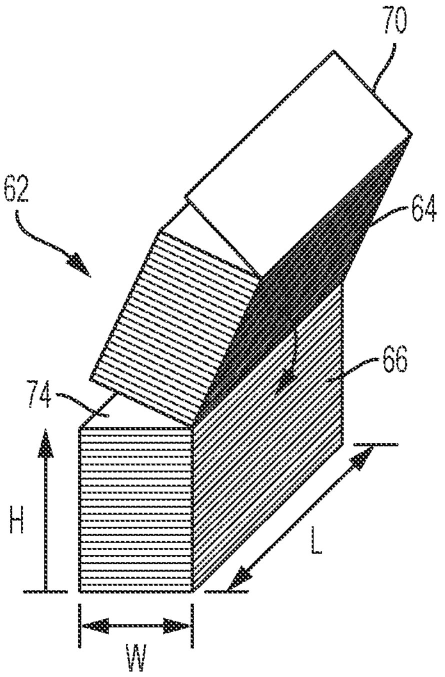
FIG. 2 is schematic elevation view of an exemplary stack of fan-folded sheet stock material as it is being split in half.

The sheet stock material 24 is provided in the form of a generally rectangular stack 62 of single-ply, fan-folded sheet stock material, as shown and further described with respect to FIG. 2. The stack 62 of sheet material is generally rectangular, with a height H, a width W orthogonal to the height H, and a length L orthogonal to the height H and the width W. The length L generally is greater than the width W. The sheet material is fan-folded, with fold lines parallel to the length L.

Figure 3:
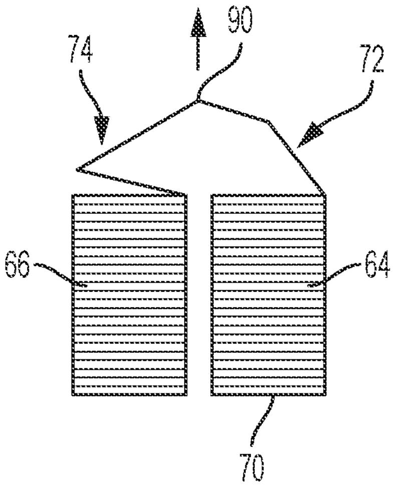
FIG. 3 is a schematic elevation view of split stacks of fan-folded sheet stock material with a center fold.
Figure 4:
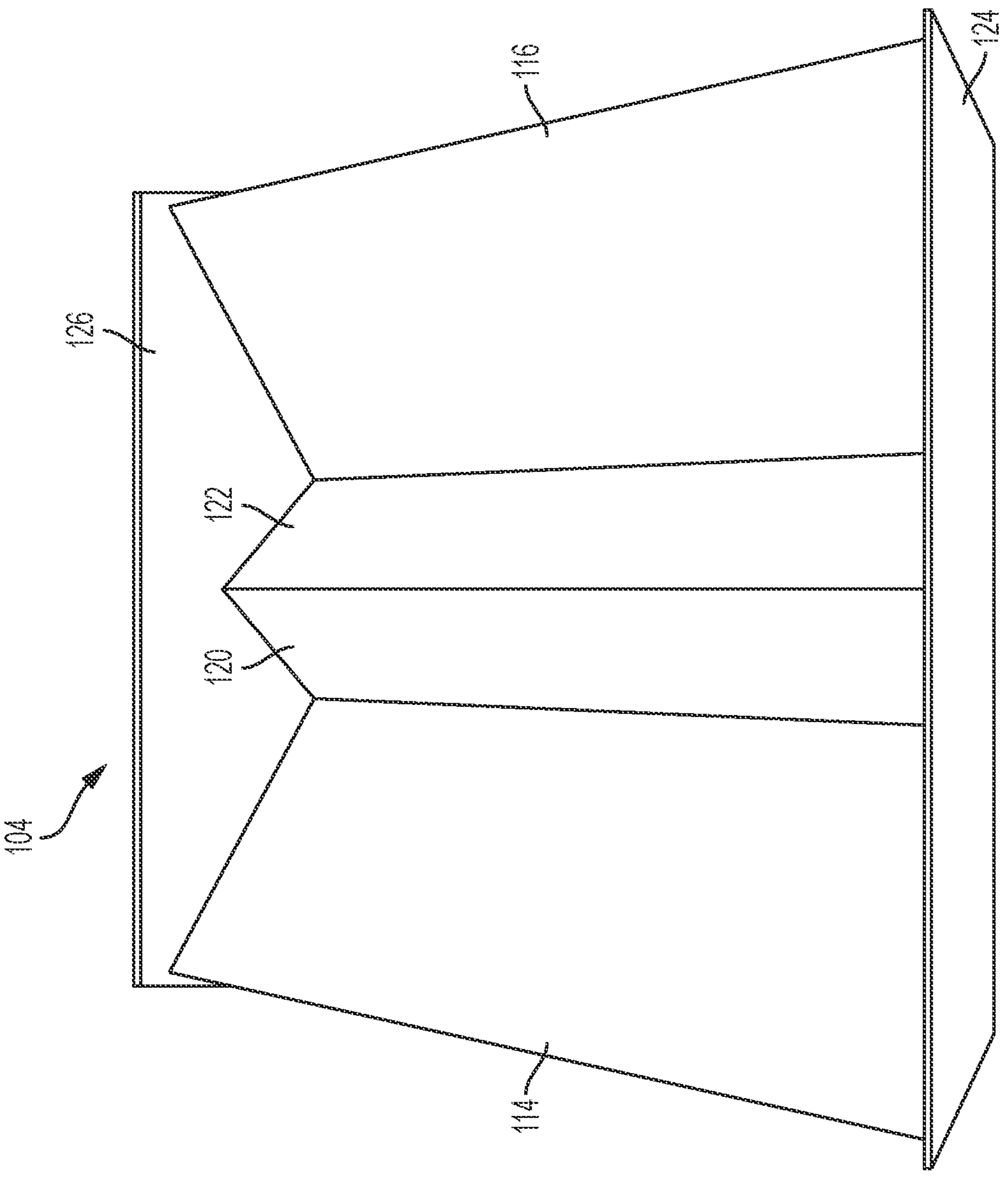
FIG. 4 is a top perspective view of a holder for supporting a supply of fan-folded sheet stock material in accordance with the invention.
Figure 5:
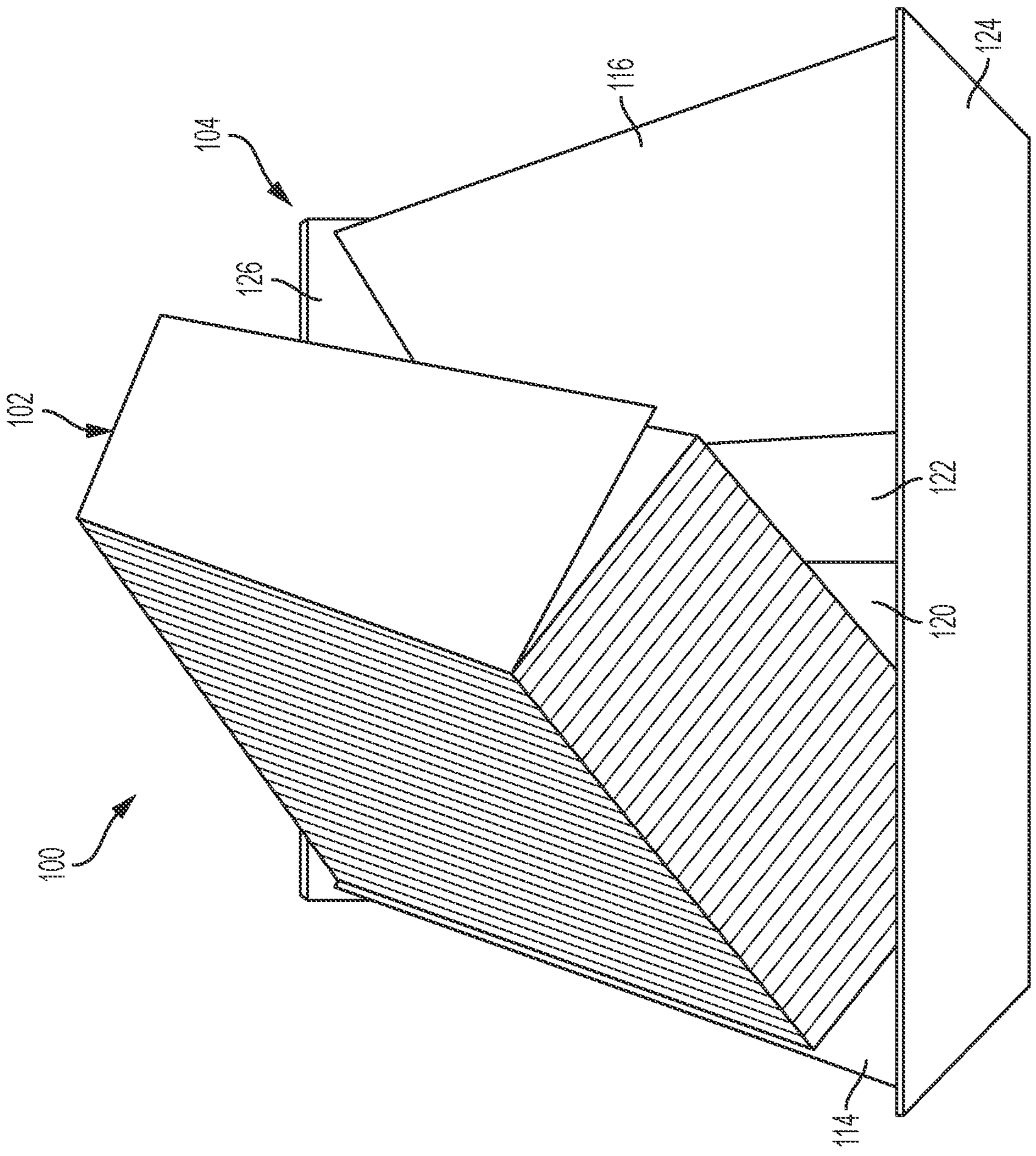
FIG. 5 is a perspective view of the holder of FIG. 4 with a stack of fan-folded sheet stock material loaded on one side of the holder.
Figure 6:
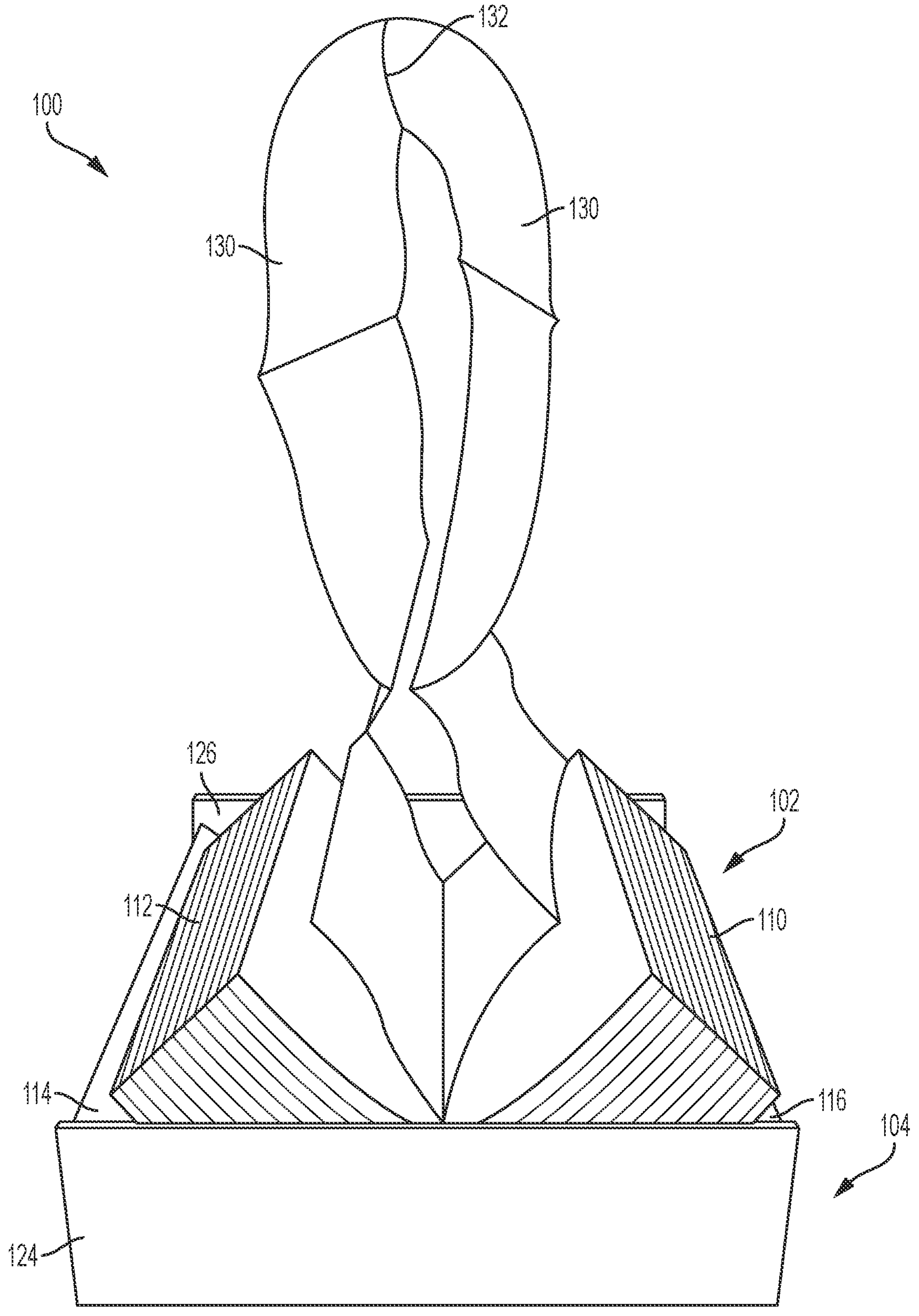
FIG. 6 is a perspective view the holder of FIG. 5 with the stack of fan-folded sheet stock material split into two stacks, connected by a center fold.
Figure 7:
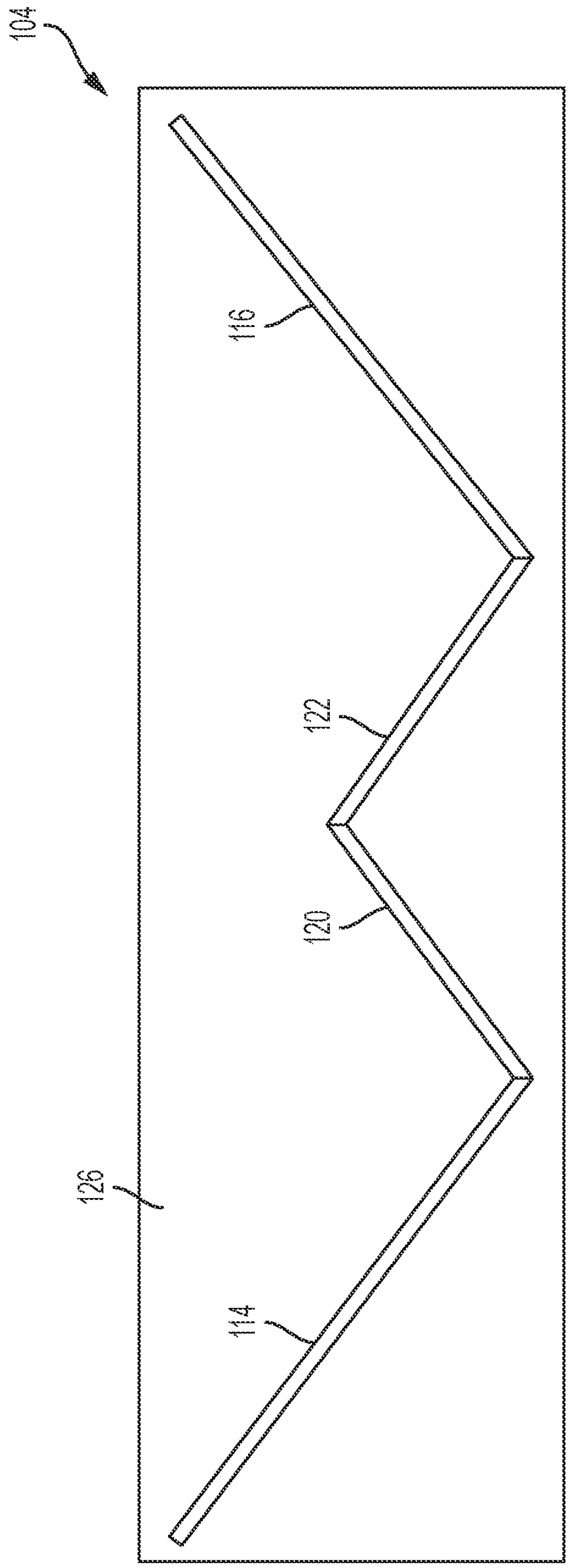
FIG. 7 is a cross-sectional view of the holder of FIG. 4 as seen in a plane parallel to the side support walls and across the inclined support surfaces.

Referring now to FIGS. 2 and 3, the stack 62 of sheet stock material has an upper portion and a lower portion, which can be referred to as an upper sub-stack 64 and a lower sub-stack 66, respectively. The stack 62 of sheet stock material can be split in half and laid open, with the upper sub-stack 64 separated from the lower sub-stack 66 by inverting the upper sub-stack 64 so that a top 70 of the upper sub-stack 64 is face down, exposing a bottom 72 of the upper sub-stack 64 and a top 74 of the lower sub-stack 66. The bottom 72 of the upper sub-stack 64 remains connected to the top 74 of the lower sub-stack 66, and a center fold line 90 that connects pages of the sheet stock material at a top side of each of the sub-stacks 64 and 66 can be pulled into the conversion machine 22 (FIG. 1) for loading. In pulling the center fold line 90 from the supply of fan-folded sheet stock material 30, sheet stock material is drawn from each of the top 74 of the lower sub-stack 66 and the bottom 72 of the upper sub-stack 64 (equally referenced as a top 72 of the inverted upper sub-stack 64), thus drawing two plies of sheet material into the converter 22 at the same time. As the sub-stacks near depletion, new stacks of sheet stock material may be spliced to respective sub-stacks 64 and 66 to maintain the ability to produce dunnage without interruption.

Referring now to FIGS. 4 to 7, the present invention also provides a supply of sheet stock material 100 that includes a stack of single-ply, fan-folded sheet stock material 102 and a holder 104 to support the stack 102 and to facilitate splitting the stack 102 into upper and lower sub-stacks 110 and 112. The holder 104 has an upper support surface with a W-shape cross-section formed by inclined outer support surfaces 114 and 116 and inclined inner support surfaces 120 and 122 positioned between the outer support surfaces 114 and 116. The inner support surfaces 120 and 122 generally are perpendicular to respective adjacent outer support surfaces 114 and 116 to support the generally rectangular stack 102 and sub-stacks 110 and 112. The outer and inner support surfaces 114, 116, 120, and 122 support bottom and side surfaces respectively of the sub-stacks 110 and 112. Laterally-spaced apart support walls 124 and 126 intersect the outer and inner support surfaces 114, 116, 120, and 122 and help to reinforce the outer and inner support surfaces 114, 116, 120, and 122 and allow the outer and inner support surfaces 114, 116, 120, and 122 to maintain their respective inclined orientations. An exemplary holder 104 is made of corrugated cardboard and an adhesive to secure the support surfaces 114, 116, 120 and 122 to the upright support walls 124 and 126. In the illustrated embodiment, the support walls 124 and 126 are substantially vertical and are connected to opposite ends of the outer and inner support surfaces 114, 116, 120, and 122.

The support surfaces include a first outer support surface 114 and a first inner support surface 120, which lies in a plane that is perpendicular to the first outer support surface 114. In the illustrated embodiment, the first inner support surface 120 intersects with a second inner support surface 122. The second inner support surface 122 lies in a plane that is perpendicular to a second outer support surface 116.

In this embodiment, each support surface 114, 116, 120, and 122 intersects an adjacent support surface, forming a continuous surface from the first outer support surface 114 to the first inner support surface 120, the second inner support surface 122, and then the second outer support surface 116. Alternatively, the support surfaces 114, 116, 120, and 122 may not provide such a continuous surface, and may be spaced apart. Moreover, the first inner support surface 114 and the second inner support surface 116 may not be perpendicular to one another. While in the illustrated embodiment the support surfaces 114, 116, 120, and 122 generally are perpendicular to adjacent support surfaces, with the first and second ones of the inner and outer support surfaces, respectively being inclined to the same degree but in opposing directions, the first outer and first inner support surfaces 114 and 120 may be inclined to a different degree and in a different direction than the second outer and second inner support surfaces 116 and 122.

In use, a stack of fan-folded sheet stock material 102 is placed on one side of the holder 104, with a bottom of the stack 102 supported by the first outer support surface 114 and an adjacent side of the stack 102 supported by the first inner support surface 120. The inclined nature of the first inner support surface 114 may urge an upper, unsupported portion of the stack 102 to fall over, thereby facilitating laying open the stack 102, separating the upper sub-stack 110 from the lower sub-stack 112. The lower sub-stack 112 remains in place against the first outer support surface 114 and the first inner support surface 120. In other words, the lower sub-stack 112 remains supported on a bottom page by the first outer support surface 114 and on an adjacent side by the first inner support surface 120. As the upper sub-stack 110 is inverted, the top page of the stack 102 or of the upper sub-stack 110 is placed against the second outer support surface 116 and an adjacent side of the sub-stack 110 is supported by the second inner support surface 122. The upper and lower sub-stacks 110 and 112 are now supported by respective support surfaces 114, 116, 120, and 122 that are inclined relative to one another, and top pages 130 of each of the sub-stacks 110 and 112 connect the sub-stacks 110 and 112.

A center fold line 132 between the connecting pages 130 at a top of the sub-stacks 110 and 112 can be drawn upward away from the sub-stacks 110 and 1112 to be fed into a dunnage conversion machine (as shown in FIG. 1), feeding a ply of sheet stock material from each sub-stack 110 and 112, thus providing a multi-ply, specifically two-ply, sheet stock material for conversion into a relatively lower density dunnage product from the original single-ply stack 102 of sheet stock material. Because the sheets of the respective sub-stacks 110 and 112 are fed into the conversion machine while connected at the center fold line 132, both plies are assured of being properly fed into the conversion machine.

Figure 8:
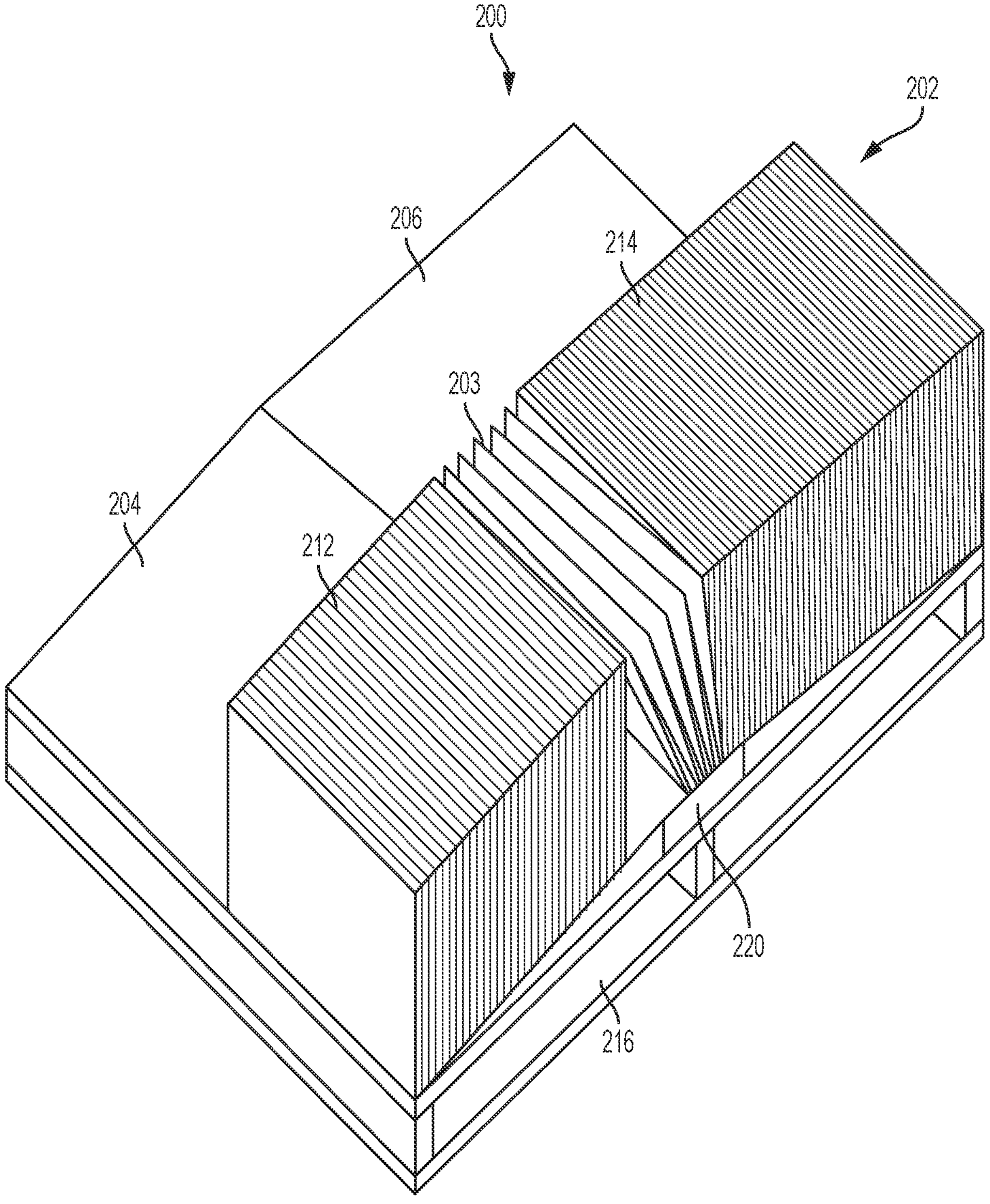
FIG. 8 is a perspective view of an alternative holder provided in accordance with the present invention.
Figure 9:
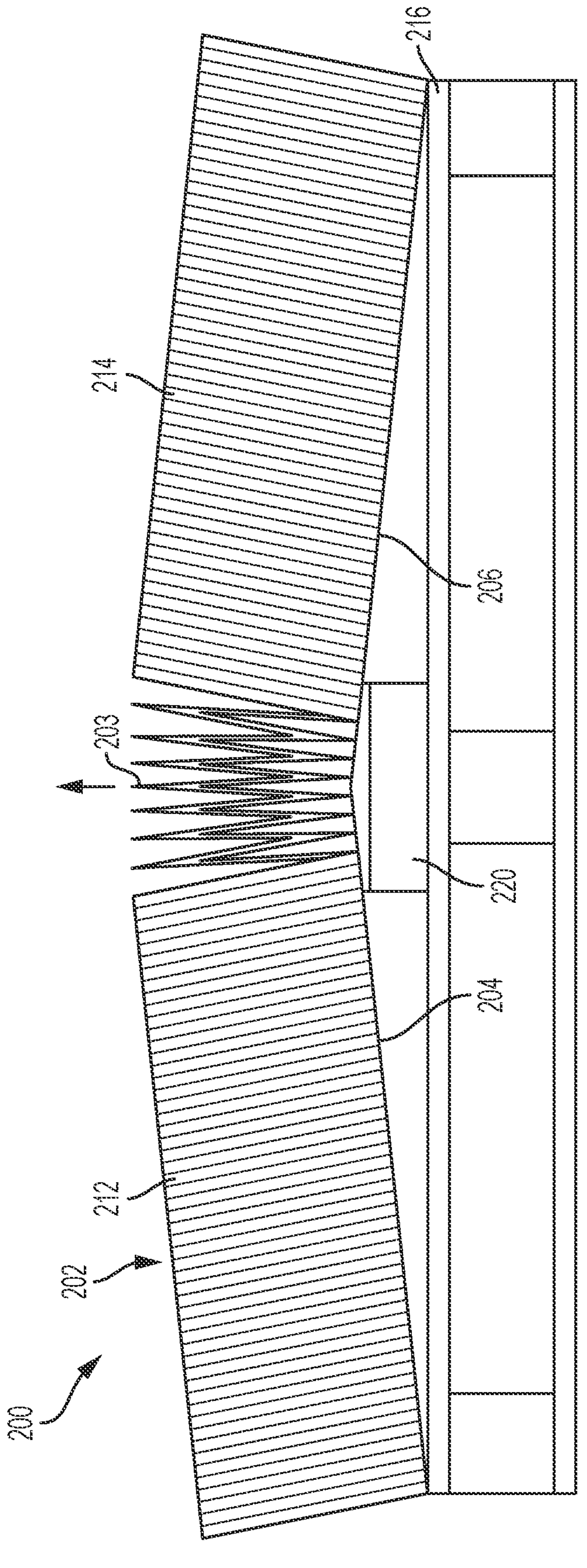
FIG. 9 is a side elevation view of the alternative holder of FIG. 8.

FIGS. 8 and 9 show an alternative holder 200 provided in accordance with the present invention. In this embodiment, a stack of fan-folded sheet stock material 202 may be provided with its height dimension H extending substantially horizontally, such that individual pages that make up the stack 202 are oriented approximately vertically. The stack 202 can be said to be supported on its side, with fold lines 203 in the sheet stock material at top and bottom sides of the stack 202. The alternative holder 200 includes oppositely-inclined sloped support surfaces 204 and 206 that support and separate respective sides of the stack 202 into two sub-stacks 212 and 214. This alternative holder 200 may be provided by scaling the holder 104 (FIG. 4) described above and arranging the inner support surfaces 120 and 122 to have sufficient length such that each of the inner support surfaces form the sloped support surfaces 204 and 206 to support the respective sub-stacks 212 and 214. The sloped support surfaces 204 and 206 may have a relatively low slope relative to horizontal, much lower than typically would be provided for the holder 104 (FIG. 4) which facilitates inverting the upper sub-stack as described above.

The exemplary alternative holder 200 shown in FIGS. 8 and 9 does not include outer support surfaces. The alternative holder 200 includes the oppositely inclined sloped support surfaces 204 and 206, the total length of which supports the entire height H of a complete stack 202. Each inclined support surface 204 and 206 supports a side of a respective sub-stack 212 or 214. The inclined support surfaces 204 and 206 may be provided on a pallet 216, as shown, with the oppositely-inclined sloped surfaces 204 and 206 extending over a center support 220 that elevates one end of each of the sloped surfaces 204 and 206, causing the stack 202 to naturally open up adjacent the center support 220, separating the stack 202 into respective sub-stacks 212 and 214, and facilitating drawing sheet material from the center portion between the sub-stacks 212 and 214. This alternative holder 200 may cause the sloped surfaces 204 and 206 to have an inverted V-shape cross-section with the sloped surfaces 204 and 206 that support the side of the stack 202 meeting at a point, or a center portion between the sloped surfaces 204 and 206 may be curved or approximately horizontal adjacent the center support 220.

In the exemplary alternative holder 200 shown in FIGS. 8 and 9, for example, a board may be laid across a center of the pallet 216 as the center support 220, and a piece of cardboard placed on top of the pallet 216 and over the board forms the sloped surfaces 204 and 206 that support the stack 202. This alternative holder 200 is simple to construct and does not include outer end supports for the top and bottom of the stack 202 as in the embodiment of FIG. 4. In either embodiment, the sheet stock material, beginning with a center fold, is readily withdrawn from between the sub-stacks.

Accordingly, a method provided by the present invention for making a dunnage product from a two-ply stock material, generally includes the following steps (references are made to the embodiment of FIGS. 4 to 7, but the method is not necessarily limited to that embodiment): (a) laying open a stack of single-ply fan-folded sheet stock material 102 to form two sub-stacks of sheet stock material 110 and 112; and (b) operating a dunnage conversion machine 22 (FIG. 1) to simultaneously draw sheet stock material from both sub-stacks of sheet stock material 110 and 112, thereby providing a two-ply sheet stock material for conversion into a dunnage product. The stack of single-ply sheet stock material 102 may include an upper portion and a lower portion, and the laying open step may include inverting the upper portion of the stack and displacing the upper portion from the lower portion, thereby forming the two sub-stacks of sheet stock material, an upper stack 110 from the inverted upper portion of the stack 102 and a lower sub-stack 112 from the lower portion of the stack 102.

The sub-stacks of sheet stock material are connected by an intermediate portion, which may include a center fold line between the two sub-stacks, and the operating step may include drawing the intermediate portion into the dunnage conversion machine.

The operating step may further include placing the intermediate portion of the sheet stock material adjacent a pair of rotating members in the dunnage conversion machine, in which case the operating step may include rotating the pair of rotating members to draw the intermediate portion of the sheet stock material between the pair of rotating members.

The laying open step also may include one or more of the following steps: (i) maintaining a continuous connection between the two stacks of sheet stock material during the laying open step, (ii) supplying a stack of single-ply sheet stock material that includes paper; (iii) supporting the two sub-stacks of sheet stock material in respective inclined orientations; and (iv) supporting the two sub-stacks of sheet stock material in inwardly-facing, oppositely-inclined orientations.

The operating step may include one or more of: (i) randomly crumpling the sheet stock material; (ii) inwardly gathering the sheet stock material; and (iii) connecting overlapping layers of sheet stock material.

In summary, the present invention provides a supply of single-ply, fan-folded sheet stock material 24 (FIG. 1) and a holder 104 that facilitates simultaneously loading multiple plies of sheet stock material into a dunnage conversion machine 22 (FIG. 1) for conversion into a dunnage product 26 (FIG. 1). The holder 104 may have inclined support surfaces 114, 116, 120, and 122 and intersecting support walls 124 and 126 that support the support surfaces 114, 116, 120, and 122 in their inclined orientations. The holder 104 may have a W-shape cross-section (FIG. 7), with inclined outer support surfaces 114 and 120 and inclined inner support surfaces 116 and 120 that may meet in the middle. The inner support surfaces 116 and 120 generally are perpendicular to adjacent outer support surfaces 114 and 120 to support a generally rectangular stack 102 and sub-stacks 110 and 112 of single-ply, fan-folded sheet stock material. The inclined support surfaces 114, 116, 120, and 122 of the holder 104 facilitate splitting the stack 102 in half and supporting the two sub-stacks 110 and 112 so that pages 130 on top of the two stacks, connected by a center fold line 90, can be drawn into the conversion machine 22 simultaneously.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment of the invention.

The invention claimed is:

1. A method for making a dunnage product from a two-ply stock material, comprising the following steps:

(a) laying open a stack of single-ply fan-folded sheet stock material to form two sub-stacks of sheet stock material;

(b) operating a dunnage conversion machine to simultaneously draw sheet stock material from both sub-stacks of sheet stock material, thereby providing a two-ply sheet stock material for conversion into a dunnage product;

wherein the stack of single-ply sheet stock material includes an upper portion and a lower portion, and the laying open step includes inverting the upper portion of the stack and displacing the upper portion from the lower portion, thereby forming the two sub-stacks of sheet stock material from the inverted upper portion of the stack and the lower portion of the stack.

2. A method as set forth in claim 1, wherein the two sub-stacks of sheet stock material are connected by an intermediate portion, and the operating step includes drawing the intermediate portion into the dunnage conversion machine.

3. A method as set forth in claim 2, wherein the operating step includes placing the intermediate portion of the sheet stock material adjacent a pair of rotating members in the dunnage conversion machine, and wherein the operating step includes rotating the pair of rotating members to draw the intermediate portion of the sheet stock material between the pair of rotating members.

4. A method as set forth in claim 1, wherein the laying open step includes maintaining a continuous connection between the two stacks of sheet stock material during the laying open step.

5. A method as set forth in claim 1, wherein the laying open step includes supplying a stack of single-ply sheet stock material that includes paper.

6. A method as set forth in claim 1, wherein the operating step includes randomly crumpling the sheet stock material.

7. A method as set forth in claim 1, wherein the operating step includes inwardly gathering the sheet stock material.

8. A method as set forth in claim 1, wherein the operating step includes connecting overlapping layers of sheet stock material.

9. A method as set forth in claim 1, wherein the laying open step includes supporting the two sub-stacks of sheet stock material in respective inclined orientations.

10. A method for making a dunnage product from a two-ply stock material, comprising the following steps:

(a) laying open a stack of single-ply fan-folded sheet stock material to form two sub-stacks of sheet stock material;

(b) operating a dunnage conversion machine to simultaneously draw sheet stock material from both sub-stacks of sheet stock material, thereby providing a two-ply sheet stock material for conversion into a dunnage product, wherein the stack of single-ply sheet stock material includes an upper portion and a lower portion, and the laying open step includes inverting the upper portion of the stack and displacing the upper portion from the lower portion to form the two sub-stacks of sheet stock material, and supporting the two sub-stacks of sheet stock material in inwardly-facing, oppositely-inclined orientations.

* * * * *